United States Patent [19]

Kuka

[11] 4,083,107
[45] Apr. 11, 1978

[54] CITRUS PEELING KNIFE

[76] Inventor: James Kuka, P.O. Box 971, Reno, Nev. 89504

[21] Appl. No.: 784,924

[22] Filed: Apr. 5, 1977

[51] Int. Cl.² .............................................. A47J 17/04
[52] U.S. Cl. .................................................. 30/123.7
[58] Field of Search .................. 30/123.5, 123.6, 123.7, 30/278, 279

[56] References Cited

U.S. PATENT DOCUMENTS

| 425,065 | 4/1890 | Duchemin | 30/279 R |
| 1,156,652 | 10/1915 | Aiken | 30/279 R |
| 2,010,414 | 8/1935 | Rekonty | 30/123.5 |

FOREIGN PATENT DOCUMENTS 489,536   7/1938   United Kingdom ............. 30/279 R Primary Examiner—Jimmy C. Peters

[57] ABSTRACT

A knife for paring the rind from a citrus fruit while having the pulp intact including an elongated handle first cutting means disposed on one end of the handle, the first cutting means including a cutting portion suspended below a shank portion by a plurality of arms, and second cutting means disposed on the other end of the elongated handle, the second cutting means including first and second parallel portions connected by an elongated intermediate portion, the first and second parallel portions being spaced apart in adjacent planes.

4 Claims, 6 Drawing Figures

U.S. Patent        April 11, 1978        4,083,107
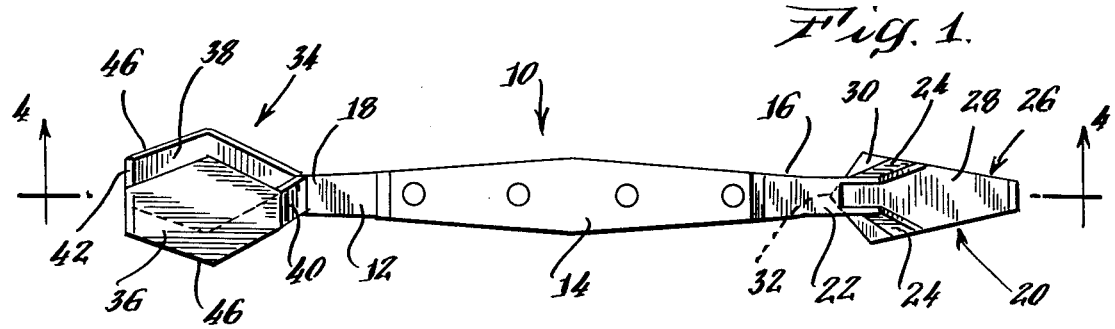
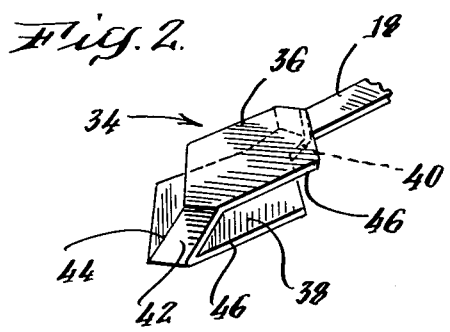 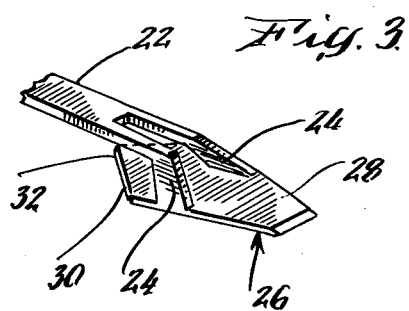
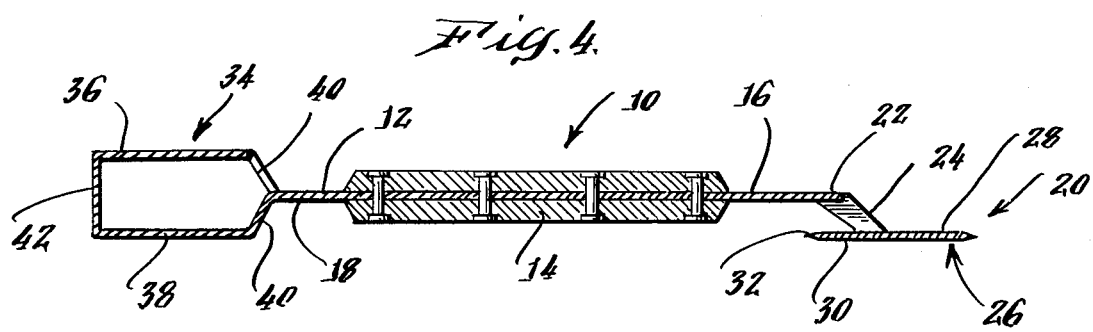
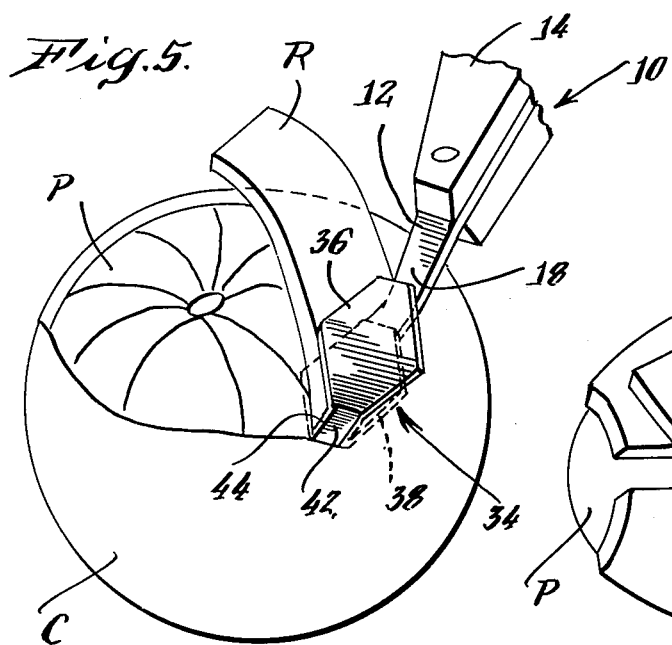 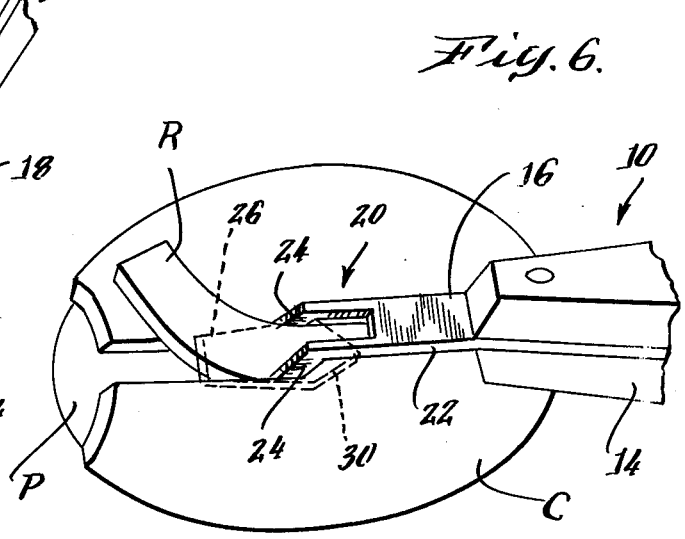

CITRUS PEELING KNIFE

BACKGROUND OF THE INVENTION

1. Field of the Invention

The present relates to a knife, and more particularly, to a knife designed to pare the rind of citrus fruits from the fruit pulp.

2. Description of the Prior Art

Citrus fruit rinds are used for many purposes apart from the fruit pulp. For example, lemon rinds are used in various alcoholic cocktails, and orange rinds are used in the preparation of marmalade. This invention provides a knife for cleaning, paring and removing the rind from the fruit pulp. It also enhances the removal of the rind to leave the entire pulp to be eaten. Provision is made so the rind may be sliced into even strips for decorative appeal when used in alcoholic cocktails.

SUMMARY OF THE INVENTION

Therefore, a primary object of the present invention is to provide a knife for peeling the rinds from citrus-type fruits wherein the rind may be separated from the pulp without damage thereto.

A further object of the present invention is to provide a knife for peeling the rinds from citrus-type fruits which may be used to accomplish its purpose with minimum difficulty for the user thereof.

A still further object of the present invention is to provide a knife for peeling the rinds from citrus-type fruits which may be used to cut strips of rind which are of uniform width as a decorative enhancement for use in an alcoholic beverage.

Still another object is to provide a knife for peeling the rinds from citrus-type fruits which is simple is design, inexpensive to manufacture, and durable.

These objects, as well as further objects and advantages, of the present invention will become readily apparent after reading the description of a non-limiting illustrative embodiment and the accompanying drawing.

A knife for peeling the rinds from citrus-type fruits according to the principles of the present invention includes an elongated handle; first cutting means disposed on one end of the elongated handle, the cutting means providing a first blade including a shank portion fixedly secured on one end thereof to one end of the elongated handle, a cutting portion disposed in a different plane than the shank, the cutting portion having sharpened edges, and a plurality of arms, each of the arms fixedly secured on one end thereof to the other end of the shank portion, the other end of each of the arms fixedly secured to the cutting portion adjacent to the edges thereof; and second cutting means disposed on the other end of the elongated handle, the second cutting means providing a blade including first and second parallel portions connected by an elongated intermediate portion, the first and second parallel portions being spaced apart in adjacent planes, at least one edge of the first, second and intermediate portions being sharpened.

BRIEF DESCRIPTION OF THE DRAWING

In order that the present invention may be more fully understood it will now be described, by way of example, with reference to the accompanying drawing in which:

FIG. 1 is a top-plan view of the preferred embodiment incorporating the principles of the present invention therein;

FIG. 2 is a front view of one of the cutting means of the preferred embodiment;

FIG. 3 is a perspective view of the other of the cutting means of the preferred embodiment;

FIG. 4 is a cross-sectional view taken substantially through the lines 4—4 of FIG. 1;

FIG. 5 is a perspective view of one of the cutting means of the preferred embodiment in use; and FIG. 6 is a perspective view of the other of the cutting means of the preferred embodiment in use.

DESCRIPTION OF THE PREFERRED EMBODIMENT

Referring now to the figures, and more particularly, to FIGS. 1 through 4 thereof, there is illustrated therein a citrus-peeling knife 10. The citrus-peeling knife 10 includes an elongated handle portion 12 preferably covered with wood 14 or the like as illustrated. The handle portion has a first end 16 and a second end 18. A first cutting means 20 is disposed on the first end 16 of the handle portion 12 and includes a shank portion 22 fixedly secured on one end thereof to the first end 16 of the handle portion 12. A pair of arms 24 are each fixedly secured to the other end of the shank portion 22. In turn, the other ends of the arms 24 are fixedly secured to a cutting portion 26 thereby securing the same in a different plane than that which the shank portion 22 is disposed in. A forward portion 28 comprising approximately two-thirds of the cutting portion 26 is rounded into an oblongtudinal shape, with a rear portion 30 comprising the other third of the cutting portion 26 being triangular in shape. The cutting portion 26 is preferably oriented so that the rear triangular portion 30 falls adjacent to the elongated handle portion 12 as illustrated. The edges 32 of the cutting portion 26 are sharpened.

Second cutting means 34 are fixedly secured to the second end 18 of the elongated handle portion 12. The second cutting means 34 includes first and second parallel blade portions 36 and 38 each affixed on an end 40 thereof to the second end 18 of the handle portion 12. The first and second parallel blade portions 36 and 38 are spaced apart in adjacent planes and are connected by an elongated intermediate portion 42. The edges 44 of the elongated intermediate portion 42 and the edges 46 of the first and second parallel blade portions 36 and 38 are sharpened. Each of the first and second parallel blade portions 36 and 38 are preferably a parallelogram in shape and are offset from each other as illustrated in FIG. 2. The longitudinal axis of the elongated intermediate portion 42 is disposed in a plane substantially perpendicular to the adjacent planes in which the first and second parallel blade portions 36 and 38 are disposed as illustrated in FIG. 4. The longitudinal axis of the elongated intermediate portion 42 is disposed transversely to the adjacent planes in which the first and second parallel blade portions 36 and 38 reside as illustrated in FIG. 2. The longitudinal axis of the elongated intermediate portion 42 preferably makes an angle of approximately 60° with blade portion 36 and with blade portion 38.

FIG. 5 illustrates the second cutting means 34 in use to remove the rind R from a citrus fruit C without damaging the pulp P thereof. The first parallel blade portion 36 acts as a guide while the second parallel blade portion 38 actually cuts the rind R. It is apparent that the knife may be inverted or used in the opposite direction to accomplish the same task.

FIG. 6 illustrates the first cutting means 20 in use to remove the rind R from a citrus fruit C without damaging the pulp P. The cutting portion 26 is drawn toward the user as it digs into the rind R thereby cutting a uniform strip of rind as the citrus knife 10 is moved along the outer surface of the citrus fruit C. The cutting portion 26 may also be pushed into a fruit to break the rind to permit use of either the first or second cutting means 20 or 34.

The first and second cutting means 20 and 34 are preferably constructed of stainless steel or the like and the elements thereof may be integrally formed as desired during manufacture.

Therefore, a primary advantage of the present invention is to provide a knife for peeling the rinds from citrus-type fruits wherein the rind may be separated from the pulp without damage thereto.

A further advantage of the present invention is to provide a knife for peeling the rinds from citrus-type fruits which may be used to accomplish its purpose with minimum difficulty for the user thereof.

A still further advantage of the present invention is to provide a knife for peeling the rinds from citrus-type fruits which may be used to cut strips of rind which are of uniform width as a decorative enhancement for use in an alcoholic beverage.

Still another advantage is to provide a knife for peeling the rinds from citrus-type fruits which is simple in design, inexpensive to manufacture, and durable.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A knife for peeling the rinds from citrus-type fruits comprising:
   an elongated handle; and
   first cutting means disposed on one end of said elongated handle, said cutting means providing a first blade including
   a shank portion fixedly secured on one end thereof to said one end of said elongated handle,
   a cutting portion disposed in a different plane than said shank, said cutting portion having sharpened edges, and
   a plurality of arms, each of said arms fixedly secured on one end thereof to the other end of said shank portion, the other end of each of said arms fixedly secured to said cutting portion adjacent the edges thereof,
   wherein substantially two-thirds of said cutting portion is rounded in to a semi-oblongitudinal shape, the other third of said cutting surface being triangular in shape.

2. A knife in accordance with claim 1, wherein said triangular portion falls adjacent to said elongated handle portion.

3. A knife for peeling the rinds from citrus-type fruits comprising:
   an elongated handle; and first cutting means disposed on one end of said elongated handle, said cutting means providing a first blade including
   a shank portion fixedly secured on one end thereof to said one end of said elongated handle,
   a cutting portion disposed in a different plane than said shank, said cutting portion having sharpened edges, and
   a plurality of arms, each of said arms fixedly secured on one end thereof to the other end of said shank portion, the other end of each of said arm fixedly secured to said cutting portion adjacent the edges thereof,
   further comprising second cutting means disposed on the other end of said elongated handle, said second cutting means providing a blade including
   first and second parallel portions connected by an elongated flat intermediate portion, said first and second parallel portions being spaced apart in adjacent planes, at least one edge of said first, second, and intermediate portions being sharpened.

4. A knife in accordance with claim 3, wherein said first and second parallel portions are substantially a parallelogram in shape and are offset from each other within said adjacent planes, the edges of said intermediate portion are disposed in a plane substantially perpendicular to said adjacent planes, said edges being inclined with respect to said adjacent parallel planes, at an angle of substantially 60° thereto.

* * * * *